(12) United States Patent
LaCoy et al.

(10) Patent No.: US 6,516,498 B2
(45) Date of Patent: Feb. 11, 2003

(54) CLAMPS

(75) Inventors: Donald Richard LaCoy, Boylston, MA (US); Shannon Powers, Sterling, MA (US)

(73) Assignee: Smiths Group PLC, London (GB)

( * ) Notice: Subject to any disclaimer, the term of this patent is extended or adjusted under 35 U.S.C. 154(b) by 0 days.

(21) Appl. No.: 09/780,381

(22) Filed: Feb. 12, 2001

(65) Prior Publication Data

US 2001/0013156 A1 Aug. 16, 2001

(30) Foreign Application Priority Data

Feb. 12, 2000 (GB) .............................................. 0003173

(51) Int. Cl.[7] ........................ F16L 33/035; F16L 33/03
(52) U.S. Cl. ............................. 24/16 R; 24/271; 24/272
(58) Field of Search ...................... 24/19, 20 R, 30.5 R, 24/23 EE, 20 EE, 20 TT, 16 R, 17 AP, 16 PB, 211, 30.5, 270, 271, 272, 589.1, 586.1, 586; 248/74.4, 230.3, 230.5, 231.11, 231.61; 285/65, 69, 399, 419–421

(56) References Cited

U.S. PATENT DOCUMENTS

| | | | | |
|---|---|---|---|---|
| 1,082,848 A | * | 12/1913 | Dargin ........................ 24/17 A |
| 3,229,998 A | * | 1/1966 | Pennington ............. 24/16 R X |
| 3,757,031 A | * | 9/1973 | Izraeli ..................... 174/138 F |
| 3,856,246 A | * | 12/1974 | Sinko .................... 248/68 CB |
| 3,996,414 A | * | 12/1976 | Artbauer et al. ............... 174/28 |
| 4,118,838 A | * | 10/1978 | Schiefer et al. ............ 24/115 R |
| 4,175,728 A | * | 11/1979 | Ferguson ................. 24/16 R X |
| 4,202,087 A | | 5/1980 | Wilderman ................ 24/263 R |
| 4,557,024 A | * | 12/1985 | Roberts et al. ............ 24/20 TT |
| 4,835,933 A | * | 6/1989 | Yung ............................ 52/685 |
| 5,150,865 A | * | 9/1992 | Miller .................... 248/74.4 X |
| 5,546,637 A | * | 8/1996 | Niedecker ................ 24/30.5 R |
| 6,126,122 A | * | 10/2000 | Ismert .................... 248/74.4 X |
| 6,161,803 A | * | 12/2000 | Daoud .................... 248/74.4 X |

FOREIGN PATENT DOCUMENTS

| | | |
|---|---|---|
| CA | 1 255 477 | 6/1989 |
| GB | 1 396 316 | 6/1975 |
| GB | 1 570 820 | 7/1980 |
| GB | 2 128 668 A | 5/1984 |
| WO | WO 99/49253 | 9/1999 |

\* cited by examiner

Primary Examiner—Anthony Knight
Assistant Examiner—Ruth C. Rodriguez
(74) Attorney, Agent, or Firm—Connolly Bove Lodge & Hutz LLP

(57) ABSTRACT

A cable clamp has two identical moulded components that can be clamped together about a cable. Each component has a yoke with a ratchet bar at one end and two short arms at its opposite end spaced by a gap and having ratchet teeth on their inner faces. The ratchet bars on each component extend in the gap between the arms on the other component and the cable extends through the aperture between the two yokes and between the two ratchet bars. The yokes can be squeezed together about the cable, causing the ratchet bars to slide over the engaging teeth, which prevents the two components being subsequently separated.

10 Claims, 3 Drawing Sheets

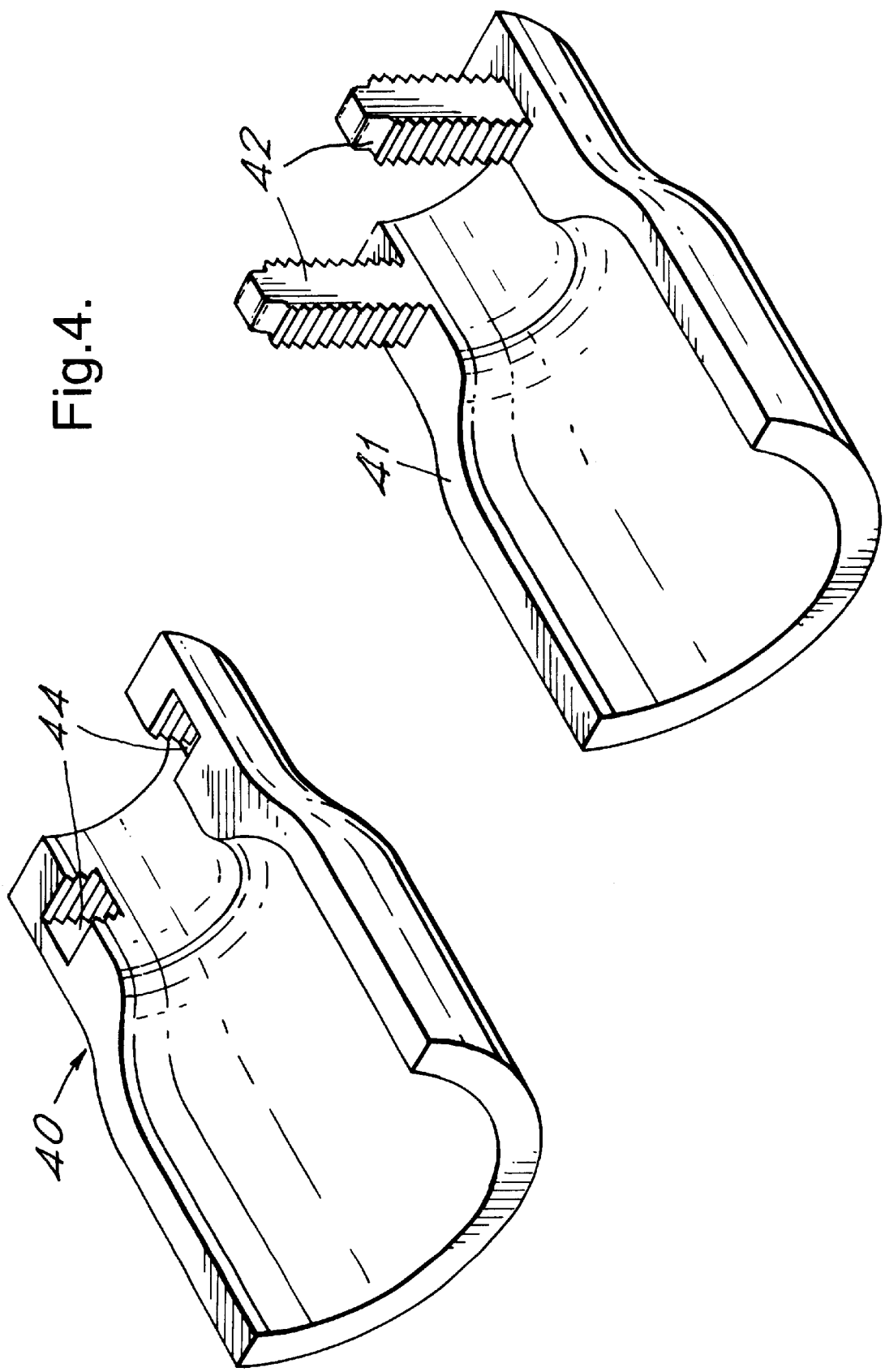

CLAMPS

BACKGROUND OF THE INVENTION

This invention relates to clamps.

The invention is more particularly concerned with clamps for cables, wires, hoses, ropes or the like.

Clamps are often used with bundles of cables, to keep them together or to help support the cables. Clamps are also used to lock onto cables where they extend in a housing, so that strain exerted on the cable is taken by the clamp and the housing rather than being transferred to an interconnection within the housing. The clamps can take various different forms. In one form, the clamp comprises a flexible strap with teeth along its length and having a ratchet integral with one end of the strap. The strap is wrapped around the cable or cables and the free end of the strap is threaded through the ratchet so that it can be tightened about the cable. It can be difficult to tighten this form of clamp because of the need to hold both the ratchet and the free end of the strap. Other forms of clamp are sold by Heyco Moulded Products, Inc of Kenilworth, N.J., USA under the trade marks "Hose Mates" and "Strap Mates". These are moulded in a generally circular shape and have engaging ratchet teeth that can be tightened by gripping between the nose of pliers. One disadvantage with this form of clamp is that any clamp can only be used with a relatively limited range of size of cables.

BRIEF SUMMARY OF THE INVENTION

It is an object of the present invention to provide an alternative clamp.

According to one aspect of the present invention there is provided a clamp for fastening about an elongate member the clamp comprising first and second yokes that can be urged together about opposite sides of the elongate member, two generally parallel ratchet bars extending between the yokes, and cooperating ratchet teeth so that as the two yokes are moved together in one direction the two ratchet bars move over the ratchet teeth to restrain the yokes against separation in an opposite direction.

Each yoke is preferably formed integrally at one end with a respective ratchet bar and at its other end with ratchet teeth arranged to cooperate with the other ratchet bar. Each yoke and its respective ratchet bar is preferably identical with the other. The ratchet teeth are preferably provided on a surface between two arms of the yoke extending laterally of the clamp. The yokes and ratchet bars may be arranged such that they can be assembled or disassembled by relative movement laterally of the one direction. Each yoke preferably has an arched section for receiving the elongate member. Alternatively, one yoke may be provided with both ratchet bars, the other yoke being provided with two sets of cooperating ratchet teeth. The ratchet bars preferably have ratchet teeth on two opposite surfaces. The yokes and ratchet bars may be moulded from a plastics material. The clamp may be for clamping about one or more cables, the yokes being formed integral with cooperating housing parts of a connector.

According to another aspect of the present invention there is provided a clamp including first and second clamping members, first and second unidirectional sliders extending parallel to one another at right angles to the clamping members, and first and second locations on the clamping members arranged to receive respective ones of the sliders in unidirectional engagement, the clamping members and sliders therebetween defining an aperture for receiving a member to be clamped.

A cable clamp according to the present invention will now be described, by way of example, with reference to the accompanying drawings.

BRIEF DESCRIPTION OF THE DRAWINGS

FIG. 4 shows a clamp incorporated in a part of a connector.

DETAILED DESCRIPTION OF PREFERRED EMBODIMENTS

Figure 1:
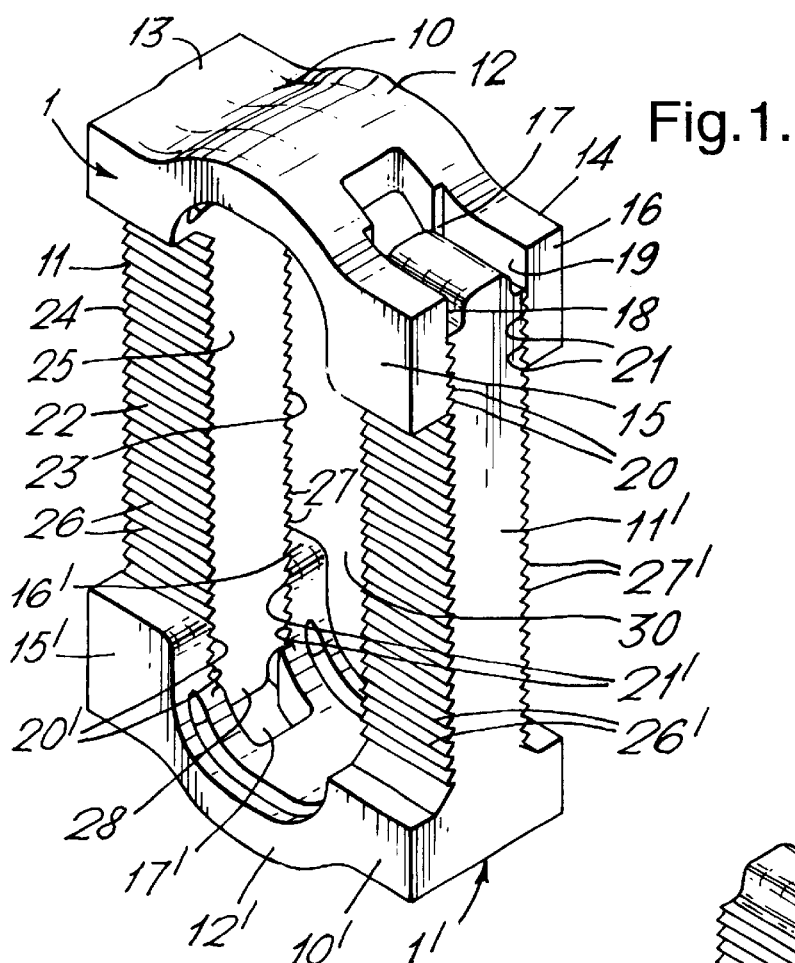
FIG. 1 is a perspective view of the clamp in a separated state.
Figure 2:
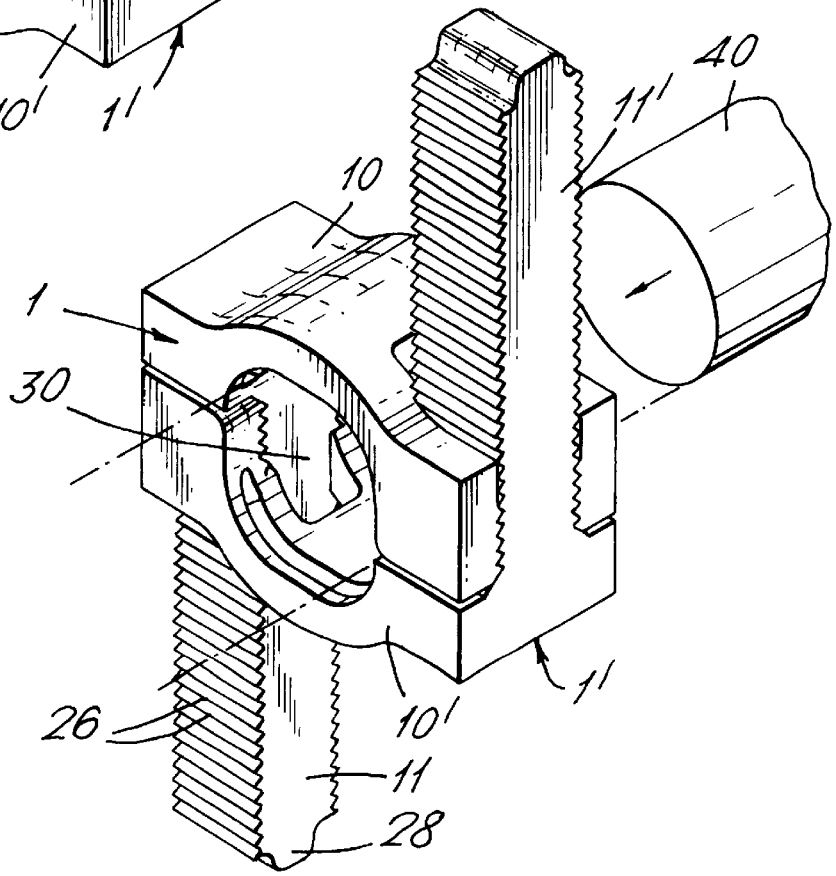
FIG. 2 is a perspective view of the clamp in a closed state.

With reference first to FIGS. 1 and 2, the cable clamp comprises two identical parts 1 and 1' moulded from a rigid plastics material. In the drawings, identical components of the two parts are given the same reference number one part having a prime' added. Each part 1 and 1' comprises a clamping member or yoke 10, 10' and a unidirectional slider or ratchet bar 11, 11' integrally moulded with one another as a single piece. Because the two parts 1 and 1' are identical, only the construction of one part 1 will be described.

The yoke 10 is rectangular in section having a central upwardly-arched section 12 and two end sectional 13 and 14. The left-hand end section 13 is plain and is joined with the ratchet bar 11. The opposite end section 14 is thickened so that it extends lower than the left-hand end section and is bifurcated into two arms 15 and 16. The arms 15 and 16 extend parallel to the length of the yoke 10, that is, laterally of the clamp, and are spaced from one another by a gap 17, which defines a location in which the ratchet bars 11 and 11' are received. The inner face 18 and 19 of each arm 15 and 16, that is, the side facing the opposite arm, is moulded with a series of several parallel ratchet teeth 20 and 21 extending horizontally.

The ratchet bar 11 is narrower than the yoke 10 and extends downwardly at right angle from the left-hand end 13 of the yoke. The bar 11 has a rectangular section with two opposite side faces 22 and 23, which are wider than its end faces 24 and 25. Both side faces 22 and 23 are moulded along substantially their entire length with ratchet teeth 26 and 27 respectively. The teeth 26 and 27 extend horizontally, parallel to the length of the yoke 10. The end faces 24 and 25 are plain and smooth. The free end of the ratchet bar is reduced in thickness slightly to form a lead portion 28.

The two parts 1 and 1' are assembled with one another as a push fit, with the free end 28 of the ratchet bar 11 of the upper part 1 extending between the arms 15' and 16' of the yoke 10' of the lower part 1'. Similarly, the ratchet bar 11' of the lower part 1' extends upwardly between the arms 15 and 16 of the upper part 1. The teeth 20, 21, 20' and 21' on the arms 15, 16, 15' and 16' and the teeth 26, 27, 26' and 27' on the ratchet bars 11 and 11' are of cooperating shape so that they lock with one another enabling relative movement in one direction but not in the opposite direction. More especially, the teeth enable the two ratchet bars 11 and 11' to slide through the gap 17 and 17' between the arms of the opposite yoke 10 and 10' so as to reduce the separation between the two yokes from the position shown in FIG. 1 to the position shown in FIG. 2 where the yokes abut one another. This thereby reduces the size of the aperture 30 between the two yokes 10 and 10' to a minimum. The ratchet teeth prevent the two parts 1 and 1' being separated in the opposite direction. Without any cable between the two parts 1 and 1', there is nothing to prevent them being pulled apart laterally, that is, parallel to the direction of the ratchet teeth, thereby disassembling the clamp. However, when tightened about a cable 40 or the like extending through the aperture 30, the cable will prevent the two yokes 10 and 10' being displaced laterally. The bars 11 and 11' could be arranged to enable their excess length to be broken off when the clamp is closed. This could be achieved by making the bars of a frangible material or by having several regions of reduced thickness spaced along the length of the bars to provide locations at which the bars can be broken.

In use, the clamp can be assembled onto a cable 40 by threading an end of the cable through the aperture 30 while the clamp is in an expanded state, as shown in FIG. 1. Alternatively, where it is inconvenient to access an end of the cable, the clamp can be assembled on the cable by taking its two separate parts 1 and 1' and joining them together about the cable. The clamp is tightened initially by finger pressure and is then fully tightened by squeezing the two parts 1 and 1' together with pliers, by gripping the central arched portions 12 and 12' of the yokes 10 and 10' between the jaws of the pliers and squeezing them together. Once fully fastened in this way, the clamp can only be removed by cutting. If, however, a removable clamp is required, it could be made from a softer plastics that enables the yoke 10 to be bent when a ratchet arm 11 is pulled laterally out of the gap 17 between the two arms 15 and 16.

The clamp can be used on a relatively wide range of cable sizes compared with previous clamps because of the large range of sizes of the aperture 30. The clamp is easily assembled and can be used on cables where it is not possible to access an end for threading through the clamp. The clamp can be made readily at low cost.

The clamp is primarily intended for use in electrical connectors, to be fastened onto a cable within the connector housing close to entrance to the housing through which the cable extends. This helps relieve external strain applied to the cable and prevents it being communicated to cable interconnections within the housing. The clamp could, however, be used to retain together a bundle of cables, wires, hoses, ropes or the like, or to attach items to a cable or to other elongate members.

Various modifications are possible. For example, instead of making the clamp from plastics it could be made from an alternative material, such as metal.

Figure 3:
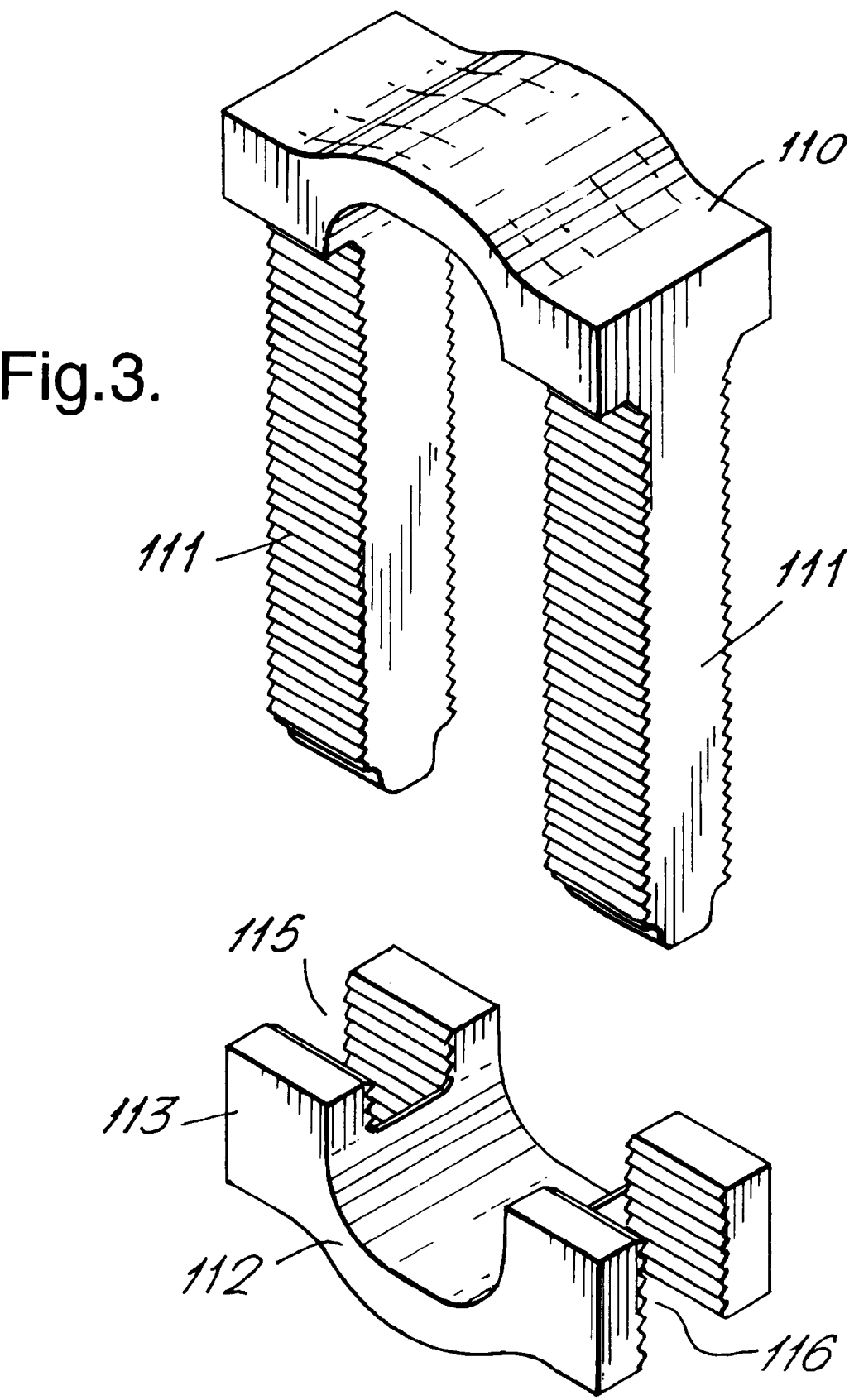
FIG. 3 is a perspective view of an alternative clamp.

The two parts of the clamp need not be identical, as shown in FIG. 3, the two ratchet bars 111 could be provided on the same yoke 110, the other yoke 112 being bifurcated at both ends 113 and 114 to forms two gaps 115 and 116 in which the ratchet bars are received.

The two parts of the clamp could be integral with cooperating parts of a connector or the like. As shown in FIG. 4, one half 41 of a connector backshell housing 40 has two projecting ratchet arms 42 and the other half has two cooperating apertures 44 formed with ratchet teeth, which engage teeth on the ratchet arms. This arrangement reduces the need for a clamp separate from the backshell.

It will be appreciated that the clamp of the present invention could be modified in various ways. The ratchet bars and teeth, for example, could be any form of slider that allows movement in one direction but resists it in the opposite direction.

What we claim is:

1. A clamp for fastening about an elongate member, the clamp comprising: first and second yokes that can be urged together about opposite sides of said elongate member; two generally parallel ratchet bars, said ratchet bars extending between said yokes; and cooperating ratchet teeth extending transversely of said elongate member, said teeth being arranged so that as said two yokes are moved together in one direction said two ratchet bars move over said ratchet teeth to restrain said yokes against separation in an opposite direction.

2. A clamp according to claim 1, wherein said yoke has two arms extending laterally of the clamp, and wherein said ratchet teeth are provided on a surface between said two arms.

3. A clamp according to claim 1, wherein each said yoke has an arched section for receiving said elongate member.

4. A clamp according to claim 1, wherein said first yoke is provided with both said ratchet bars and said second yoke is provided with two sets of cooperating ratchet teeth.

5. A clamp according to claim 1, wherein said ratchet bars have ratchet teeth on two opposite surfaces.

6. A clamp according to claim 1, wherein said yokes and said ratchet bars are moulded from a plastics material.

7. A clamp according to claim 1 for clamping about one or more cables, and wherein said yokes are formed integral with cooperating housing parts of a connector.

8. A clamp according to claim 1, wherein each said yoke is formed integrally at one end with a respective one of said ratchet bars and at an opposite end with ratchet teeth arranged to cooperate with the other said ratchet bar.

9. A clamp according to claim 8, wherein each said yoke with its respective ratchet bar is identical with the other.

10. A clamp comprising: first and second cooperating connector housing parts, wherein said first and second housing parts include two ratchet bars arranged to extend parallel with one another and two cooperating apertures arranged to receive respective ones of the ratchet bars such that a cable can be located between the ratchet bars and the connector parts can be clamped about the cable by pushing the ratchet bars along their length in respective apertures, and wherein said ratchet bars have teeth arranged to extend transversely of said cable.

\* \* \* \* \*